US012623765B1

(12) United States Patent
Stafford et al.

(10) Patent No.: US 12,623,765 B1
(45) Date of Patent: May 12, 2026

(54) SERVICE DOOR AND LATCHING ASSEMBLY FOR COWLS ON MARINE PROPULSION DEVICES

(71) Applicant: Brunswick Corporation, Mettawa, IL (US)

(72) Inventors: Bradley R. Stafford, Omro, WI (US); Devan R. Faust, Fond du Lac, WI (US); Steven J. Amerling, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 466 days.

(21) Appl. No.: 18/197,421

(22) Filed: May 15, 2023

Related U.S. Application Data

(60) Provisional application No. 63/424,997, filed on Nov. 14, 2022.

(51) Int. Cl.
*B63H 20/32* (2006.01)
*E05C 19/14* (2006.01)
*F02M 35/10* (2006.01)

(52) U.S. Cl.
CPC ............ *B63H 20/32* (2013.01); *E05C 19/14* (2013.01); *F02M 35/10242* (2013.01)

(58) Field of Classification Search
CPC .... B63H 20/32; E05C 19/14; F02M 35/10242
See application file for complete search history.

(56) References Cited

U.S. PATENT DOCUMENTS 5,493,881 A * 2/1996 Harvey .................. E05C 1/145 70/279.1
9,580,943 B1 2/2017 Amerling et al.
9,926,064 B1 3/2018 Tuchscherer
10,161,168 B1 * 12/2018 VanRuiswyk ............ E05C 9/00
10,718,152 B2 7/2020 Brandes et al.
11,140,555 B2 10/2021 Thai et al.
11,312,462 B1 4/2022 Faust et al.
11,486,340 B1 11/2022 Gunderson et al.
11,577,809 B1 2/2023 Faust et al.

FOREIGN PATENT DOCUMENTS

DE 202017105394 U1 * 9/2017 ............ E05B 85/10

* cited by examiner

*Primary Examiner* — Stephen P Avila
(74) *Attorney, Agent, or Firm* — Andrus Intellectual Property Law, LLP

(57) ABSTRACT

A cowling may be configured for an outboard marine drive. The cowling may include a top cowl defining a cowling interior, a service door on the top cowl, and a latching mechanism. The service door may be pivotable into and between an open position providing access to the cowling interior and a closed position enclosing the cowling interior. The latching mechanism may include a lock assembly movable into a locked position in which the service door is retained in the closed position and an unlocked position in which the service door is movable between the closed and open positions and an actuator assembly configured to actuate the lock assembly to move from the locked position to the unlocked position. The actuator assembly may be remote from the lock assembly and accessible from outside the top cowl.

22 Claims, 11 Drawing Sheets

SERVICE DOOR AND LATCHING ASSEMBLY FOR COWLS ON MARINE PROPULSION DEVICES

CROSS-REFERENCE TO RELATED APPLICATION

The present application claims priority to U.S. Provisional Patent Application No. 63/424,997, filed Nov. 14, 2022, which is hereby incorporated herein by reference.

FIELD

The present disclosure relates to marine propulsion devices, and more particularly to service doors and latching assemblies for cowls on marine propulsion devices.

BACKGROUND

The following U.S. Patent is incorporated herein by reference:

U.S. Pat. No. 11,312,462 discloses a cowling for a marine drive. The cowling has first and second cowl portions for enclosing a powerhead, and a latching device which is movable into a latched position in which the powerhead is enclosed by the first cowl and second cowl portions and an unlatched position in which the second cowl portion is movable with respect to the first cowl portion so that the powerhead is accessible. The latching device has an electric actuator configured to automatically move the latching device from the latched position to the unlatched position and a manually-operable input device which is accessible from outside of the cowling and is configured to actuate the electric actuator to thereby automatically move the latching device from the latched position to the unlatched position.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

In non-limiting examples disclosed herein, a cowling may be configured for a marine drive. The cowling may include a top cowl defining a cowling interior, a service door on the top cowl, and a latching mechanism. The service door may be pivotable into and between an open position providing access to the cowling interior and a closed position enclosing the cowling interior. The latching mechanism may include a lock assembly movable into a locked position in which the service door is retained in the closed position and an unlocked position in which the service door is movable between the closed and open positions and an actuator assembly configured to actuate the lock assembly to move from the locked position to the unlocked position. The actuator assembly may be remote from the lock assembly and accessible from outside the top cowl.

The top cowl may include an air inlet configured to direct air into the cowling interior, and the actuator may be positioned in the air inlet. The actuator assembly may comprise a button movable between an unpressed position and a pressed position to actuate the lock assembly to move into the unlocked position. The actuator assembly may comprise a rocker button pivotable about a pivot axis between the unpressed position and the pressed position, and the rocker button may be balanced so that a center of gravity of the rocker button is located along the pivot axis. The service door may be located on a top side of the top cowl and the actuator assembly may be located on a lateral side of the top cowl. The lock assembly may comprise a latch member movable between a latched position in which the latch member retains the service door in the closed position and an unlatched position in which the service door is movable between the closed and open positions, and a lock member configured to retain the latch member in the latched position prior to actuation of the lock member by the actuator assembly. The cowling may further comprise a biasing device configured to bias the latch member into the unlatched position, and/or a flexible connector having a first end coupled to the lock assembly and a second end coupled to the actuator assembly.

In non-limiting examples, a cowling is for a marine drive. The cowling comprises a top cowl defining a cowling interior, a service door on the top cowl, the service door being pivotable into and between an open position providing access to the cowling interior and a closed position enclosing the cowling interior, and a latching mechanism. The latching mechanism comprises a lock assembly movable into a locked position in which the service door is retained in the closed position and an unlocked position in which the service door is movable between the closed and open positions and an actuator assembly configured to actuate the lock assembly to move from the locked position to the unlocked position, wherein the actuator assembly is remote from the lock assembly and accessible from outside the top cowl.

Optionally, the top cowl comprises an air inlet configured to direct air into the cowling interior, and wherein the actuator is positioned in the air inlet. Optionally, the actuator assembly comprises a button movable between an unpressed position and a pressed position to actuate the lock assembly to move into the unlocked position. Optionally, the button is a rocker button pivotable about a pivot axis between the unpressed position and the pressed position and the rocker button is balanced so that a center of gravity of the rocker button is located along the pivot axis. Optionally, the service door is located on a top side of the top cowl and the actuator assembly is located on a lateral side of the top cowl.

Optionally, the lock assembly comprises a latch member movable between a latched position in which the latch member retains the service door in the closed position and an unlatched position in which the service door is movable between the closed and open positions and a lock member configured to retain the latch member in the latched position prior to actuation of the lock member by the actuator assembly. Optionally, the cowling comprises a biasing device configured to bias the latch member into the unlatched position. Optionally, the lock member is movable into and between an unactuated position in which the latch member is retained in the latched position and an actuated position in which the latching member is movable from the latched position to the unlatched position, and the cowling may comprise a biasing device configured to bias the lock member into the unactuated position. Optionally, the lock member is movable into and between an unactuated position in which the latch member is retained in the latched position and an actuated position in which the latching member is movable from the latched position to the unlatched position, and the cowling may further comprise a biasing device configured to bias the lock member into the unactuated position and the latch member into the unlatched position.

Optionally, the cowling comprises a flexible connector having a first end coupled to the actuator assembly and a second end coupled to the lock assembly. Optionally, the flexible connector comprises a sleeve and a cable extending through the sleeve from a first cable end coupled to the actuator assembly and a second end coupled to the lock assembly, the cable being slidable within the sleeve, and the actuation assembly may be configured to pull the first cable end of the cable to actuate the lock assembly to move from the locked position to the unlocked position. Optionally, the cable extends through a biasing device at one of the first end of the flexible connector and the second end of the flexible connector, and wherein the biasing device is configured to tension the cable. Optionally, the actuator assembly comprises a button pivotably mounted on an actuator bracket, and the flexible connector may extend through a through-bore formed through the actuator bracket and the first end of the flexible connector is coupled to the button. Optionally, the cowling comprises a biasing device configured to bias the service door into the open position.

In non-limiting examples, a latching mechanism is for a service door on a cowling for a marine drive, the service door movable into and between an open position and a closed position. The latching mechanism comprises a lock assembly movable into and between locked position in which the service door is retained in the closed position and an unlocked position in which the service door is movable between the closed and open positions, an actuator assembly configured to actuate the lock assembly to move from the locked position to the unlocked position, wherein the actuator assembly is remote from the lock assembly and accessible from outside the cowling, and a flexible connector operatively connecting the actuator assembly to the lock assembly, the flexible connector having a first end coupled to the actuator assembly and a second end coupled to the lock assembly.

Optionally, the lock assembly is positioned proximate the service door on a top side of the cowling and the actuator assembly is positioned in an air inlet on a lateral side of the cowling. Optionally, the actuator assembly comprises a rocker button pivotable about a pivot axis between an unpressed position and a pressed position, and the rocker button may be balanced so that a center of gravity of the rocker button is located along the pivot axis. Optionally, the lock assembly comprises a latch member movable into and between a latched position in which the latch member retains the service door in the closed position and an unlatched position in which the service door is movable between the closed and open positions, and a lock member may be configured to retain the latch member in the latched position prior to actuation of the lock member by the actuator assembly. Optionally, the lock member is movable, via the actuator assembly, into and between an unactuated position in which the latch member is retained in the latched position and an actuated position in which the latching member is movable from the latched position to the unlatched position.

Optionally, the cowling comprises a first biasing device configured to bias the lock member into the unactuated position and a second biasing device configured to bias the latch member into the unlatched position. Optionally, the first biasing device and the second biasing device are part of a unitary double coil torsion spring. Optionally, the flexible connector comprises a sleeve and a cable extending through the sleeve from a first cable end coupled to the actuator assembly and a second end coupled to the lock assembly, the cable being slidable within the sleeve, and the actuation assembly may be configured to pull the first cable end of the cable to actuate the lock assembly to move from the locked position to the unlocked position. Optionally, the flexible connector includes a biasing device at one of the first end of the flexible connector and the second end of the flexible connector, and wherein the biasing device is configured to tension the cable. Optionally, the actuator assembly comprises a rocker button and the lock assembly comprises a lock member, and the biasing device of the flexible connector may be configured to bias the rocker button into an unpressed position and the lock member into an unactuated position.

BRIEF DESCRIPTION OF THE DRAWINGS

Examples are provided with reference to the following drawing figures. The same numbers are used throughout to reference like features and components.

DETAILED DESCRIPTION

Figure 1:
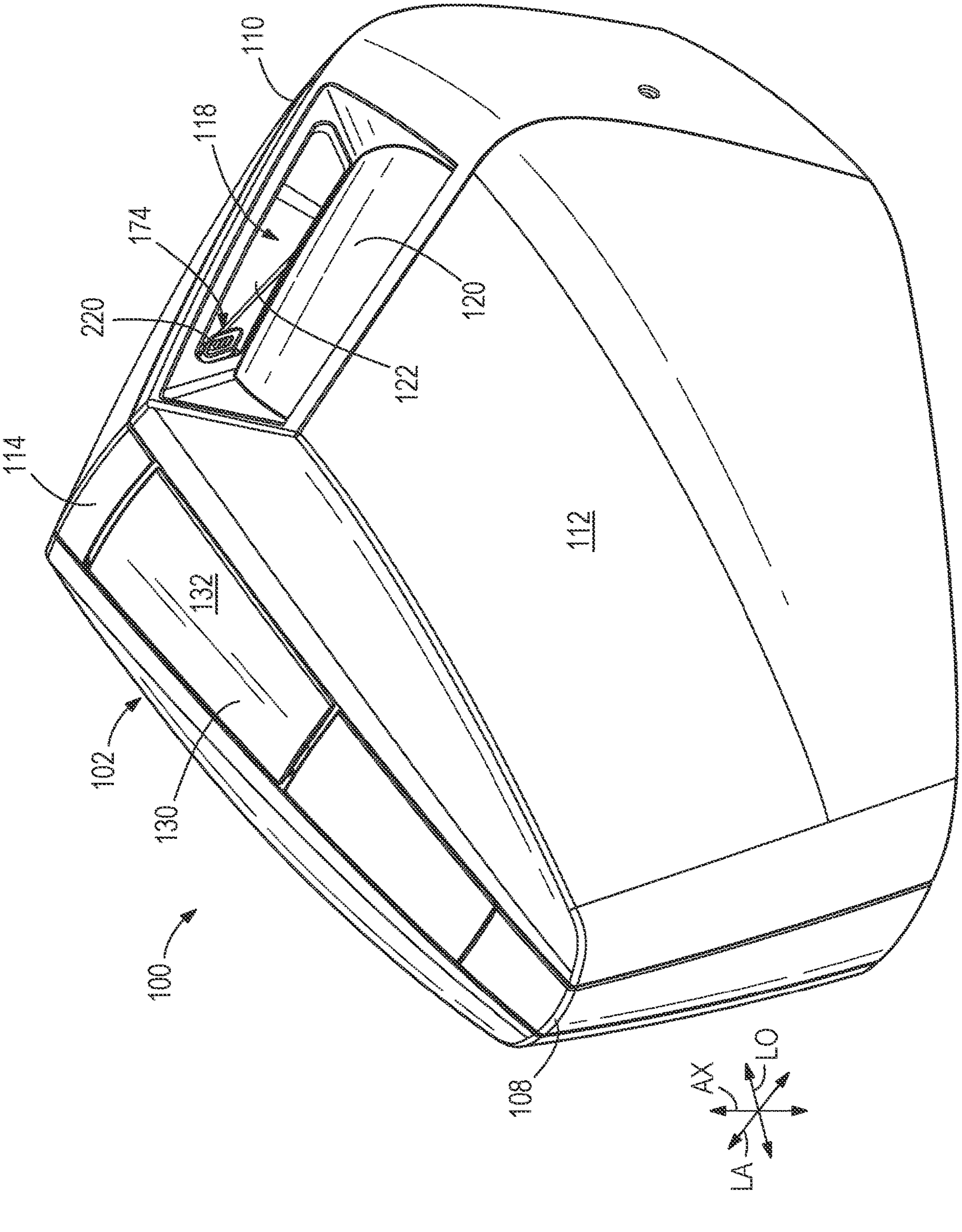
FIG. 1 is a perspective view of a cowling for a marine drive including a service door and a remotely actuated latching mechanism.
Figure 2:
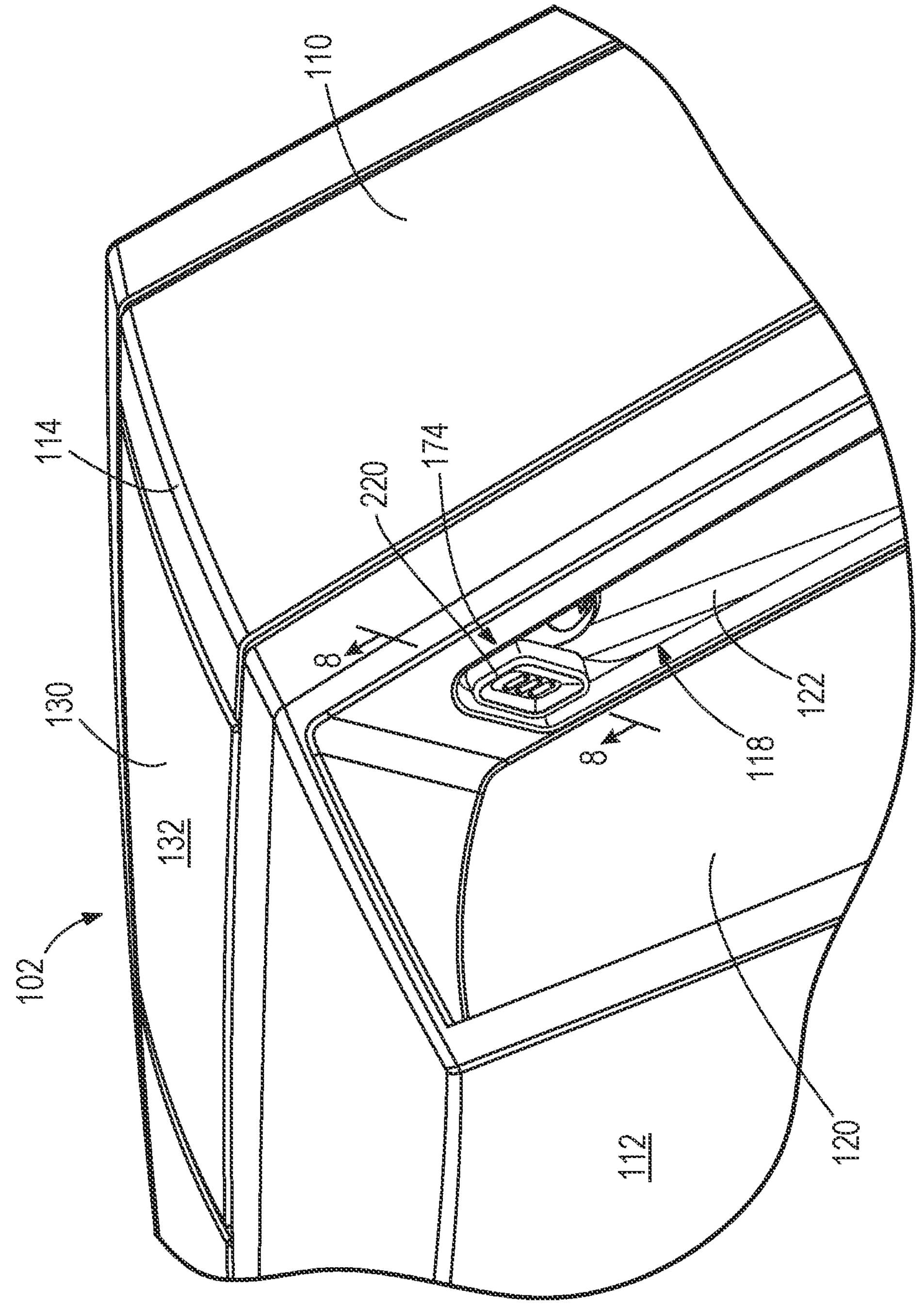
FIG. 2 is a detailed perspective view of the latching mechanism of FIG. 1 on the cowling.

FIGS. 1-2 depict a cowling 100 for a marine propulsion device configured for propelling a marine vessel in a body of water. The cowling 100 extends from a top to bottom in an axial direction AX, from front to back in a longitudinal direction LO which is perpendicular to the axial direction AX, and from side to opposite side in a lateral direction LA which is perpendicular to the axial direction AX and perpendicular to the longitudinal direction LO. In the illustrated embodiment, the marine propulsion device is configured as an outboard marine drive. A transom bracket assembly (not shown) supports the marine drive on the transom (not shown) of the marine vessel such that the cowling 100 and marine drive are trimmable up and down relative to the transom bracket assembly, including in non-limiting examples wherein the marine drive is raised completely out of the water.

Figure 3:
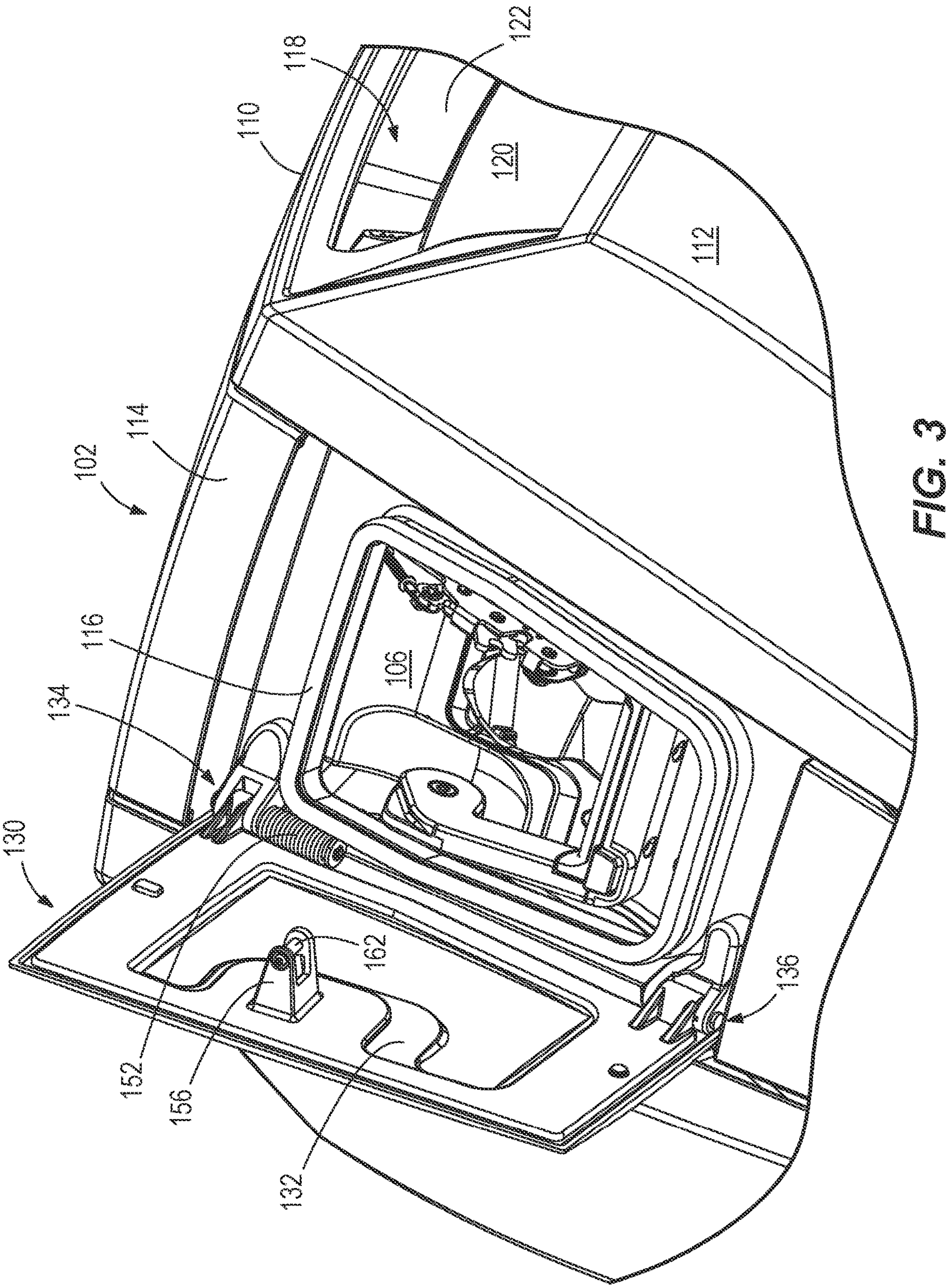
FIG. 3 is a perspective view of the cowling of FIG. 2 with the service door in an open position.

Referring to FIGS. 1-3, the cowling 100 includes a top cowl 102 having a front side 108, a rear side 110 opposite the front side 108, opposing lateral sides 112 extending between the front side 108 and the rear side 110, and a top side 114. The top cowl 102 defines a cowling interior 106 (see FIG. 3) in which a portion of a supporting frame (not shown) is enclosed and various components of the marine propulsion device are disposed. In the illustrated embodiments, inlets 118 are formed in opposite lateral sides 112 of the top cowl 102. The inlets 118 may be configured to allow air to enter the interior 106 of the cowling 100 in some embodiments. Each lateral side 112 includes a curved surface 120 that curves radially inward from the lateral sides 112 towards an opening 122 of the corresponding inlet 118. Air may be directed into the cowling interior 106 via the inlets 118. Some embodiments, however, may include at least one inlet positioned at a different location part of the top cowl 102 than those of the illustrated embodiments, such as the front side 108, the rear side 110, or any other portion of the cowling 100. A service door 130 is positioned on the top cowl 102 and is pivotable into and between an open position providing access to the cowling interior 106 via an opening 116 (FIG. 3) and a closed position enclosing the cowling interior 106 (FIGS. 1-2). Some embodiments, however, may include a service door positioned on a different side of the top cowl 102, and/or a service door at a different location on the top side 114 of the cowling 100.

Figure 4:
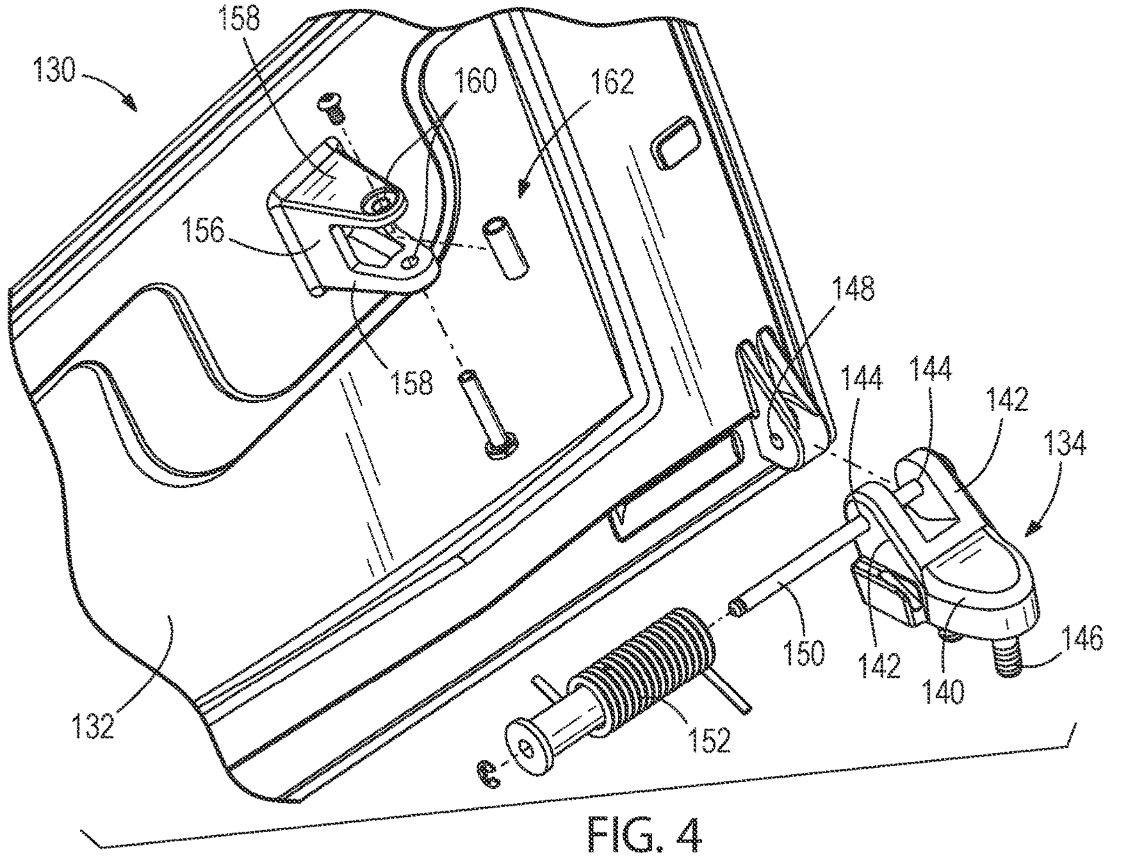
FIG. 4 is an exploded perspective view of the service door of FIG. 3.

FIG. 4 depicts an exploded view of the service door 130. The service door 130 includes a door panel 132 that is hingedly coupled to the top cowl 102 and/or the support frame by a first hinge 134 and a second hinge 136 (see FIG. 3). Each hinge 134, 136 includes a hinge base 140 with two upwardly extending arms 142 and opposing through-bores 144 formed in each arm 142. Each hinge base 140 is coupled to the top cowl 102 by at least one fastener 146. The door panel 132 includes mounting openings 148 positioned on a bottom side of the door panel 132. Each mounting opening 148 is received between the arms 142 of a corresponding hinge base 140, and a corresponding hinge axle 150 extends through the through-bores 144 of the arms and the mounting opening 148 to pivotably couple the door panel 132 to the top cowl 102 and/or the support frame.

At least one of the hinges 134, 136 operates in conjunction with a biasing device 152 configured to bias the service door 130 towards the open position. In the illustrated embodiments, the first hinge 134 includes a torsion spring 152 mounted on the first hinge axle 150. Other embodiments, however, may include a different biasing device, such as another type of spring, a resiliently deformable material, or another component that provides a biasing force. The spring 152 is configured to exert a biasing force between the door panel 132 and the first hinge 134, the top cowl 102, and/or the support frame to bias the service door 130 into the open position. A door latch bracket 156 projects downward from the bottom surface of the door panel 132. The door latch bracket 156 includes opposing arms 158 with opposing through-bores 160 formed through the arms 158. A roller pin 162 is received in the through-bores 160 and extends between the two arms 158. As detailed in further detail below, the roller pin 162 is configured to be engaged by a latching mechanism 170 (FIGS. 5 and 6) to retain the door panel 132 in the closed position.

Figure 5:
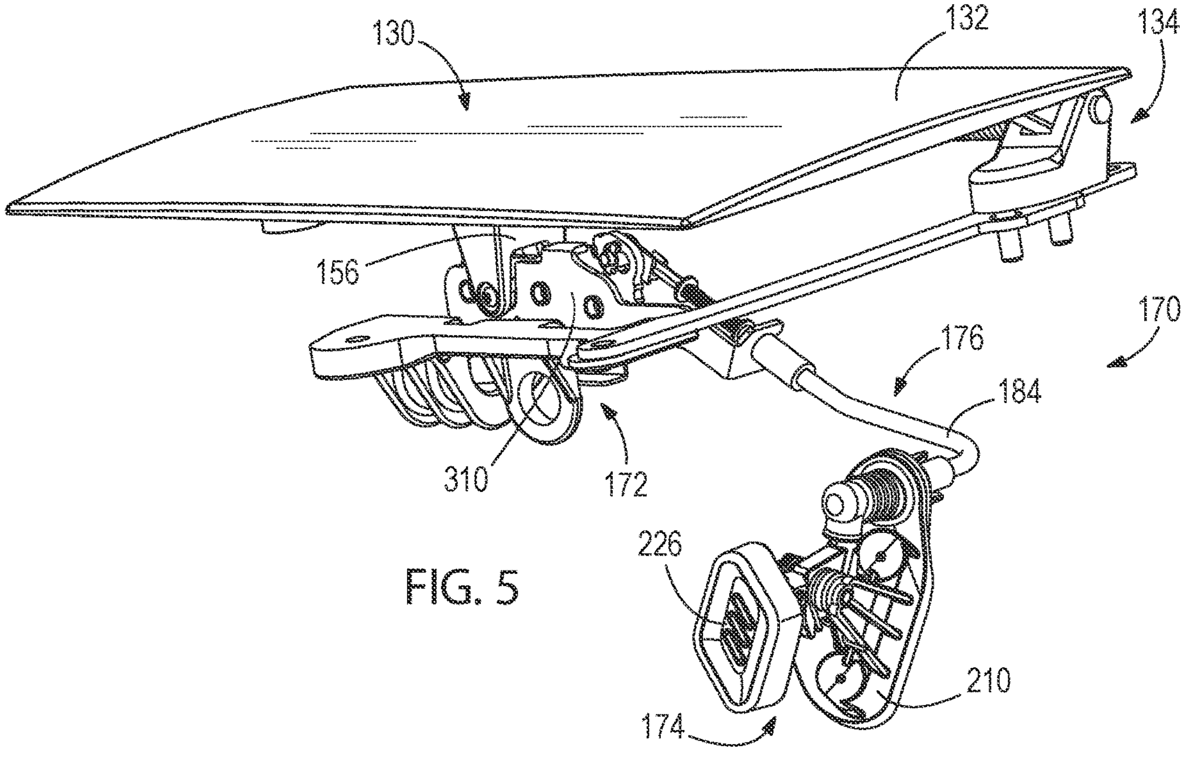
FIG. 5 is a perspective view of the service door and latching mechanism of FIG. 3.
Figure 6:
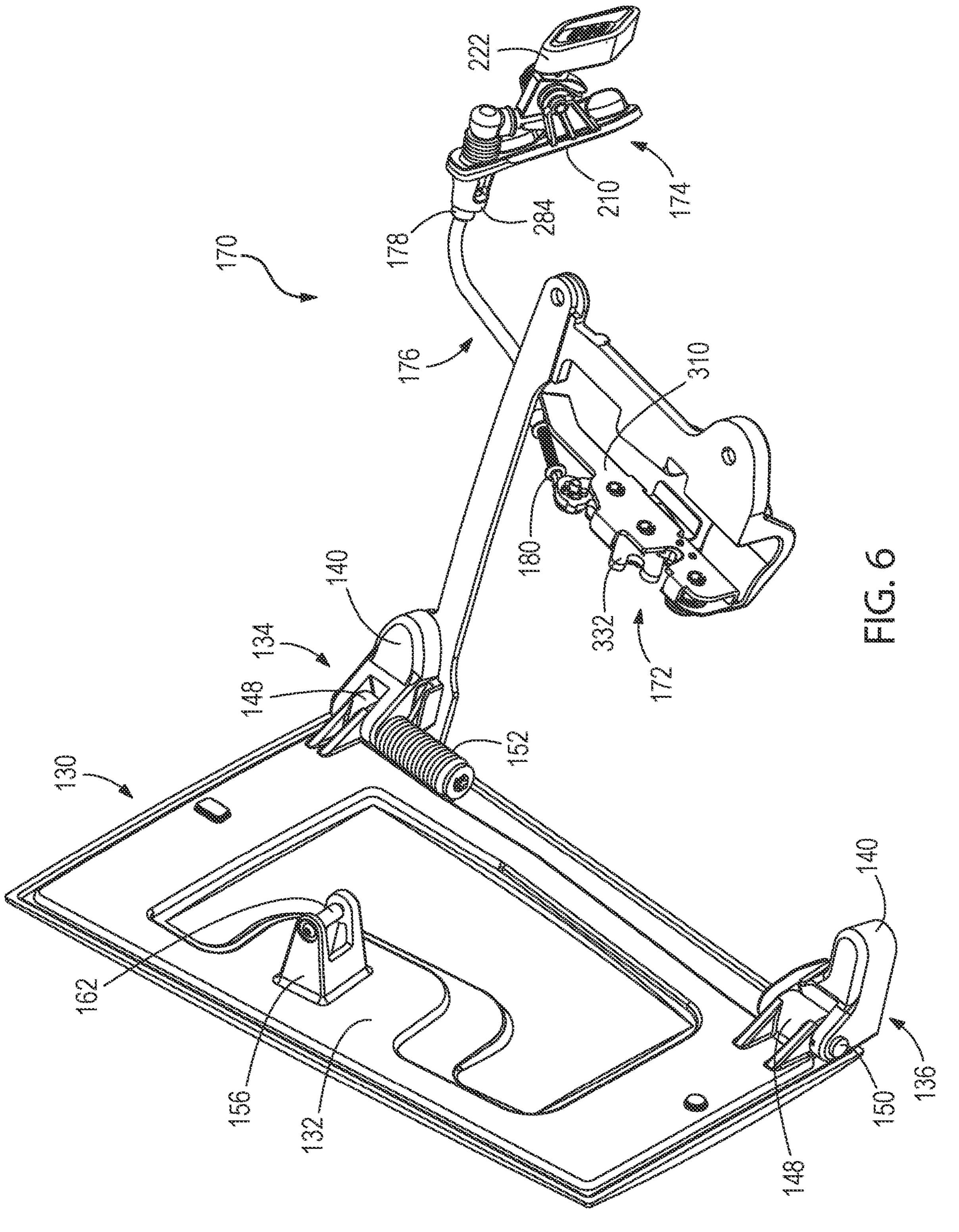
FIG. 6 is a perspective view of the latching mechanism and service door of FIG. 5 with the service door in the open position.

Embodiments of the cowling 100 may include a novel latching mechanism 170 configured to selectively retain the service door 130 in a closed position. FIGS. 5 and 6 depicts the latching mechanism 170 with the service door 130 in the closed position (FIG. 5) and the open position (FIG. 6). The latching mechanism 170 includes a lock assembly 172 and an actuator assembly 174. The lock assembly 172 is configured to move into and between a locked position in which the service door 130 is retained in the closed position and an unlocked position in which the service door 130 is movable between the closed and open positions. The actuator assembly 174 is configured to actuate the lock assembly 172 to move from the locked position to the unlocked position. The actuator assembly 174 is positioned at a location that is remote from the lock assembly 172 and accessible from outside the top cowl 102. In some embodiments, the actuator assembly 174 may be positioned on the top cowl 102 so that the actuator assembly is at least partially concealed by the cowling 100. A flexible connector 176 operatively connects the lock assembly 172 and the actuator assembly 174. The flexible connector 176 includes a first end 178 coupled to the actuator assembly 174 and a second end 180 coupled to the lock assembly 172.

Figure 11:
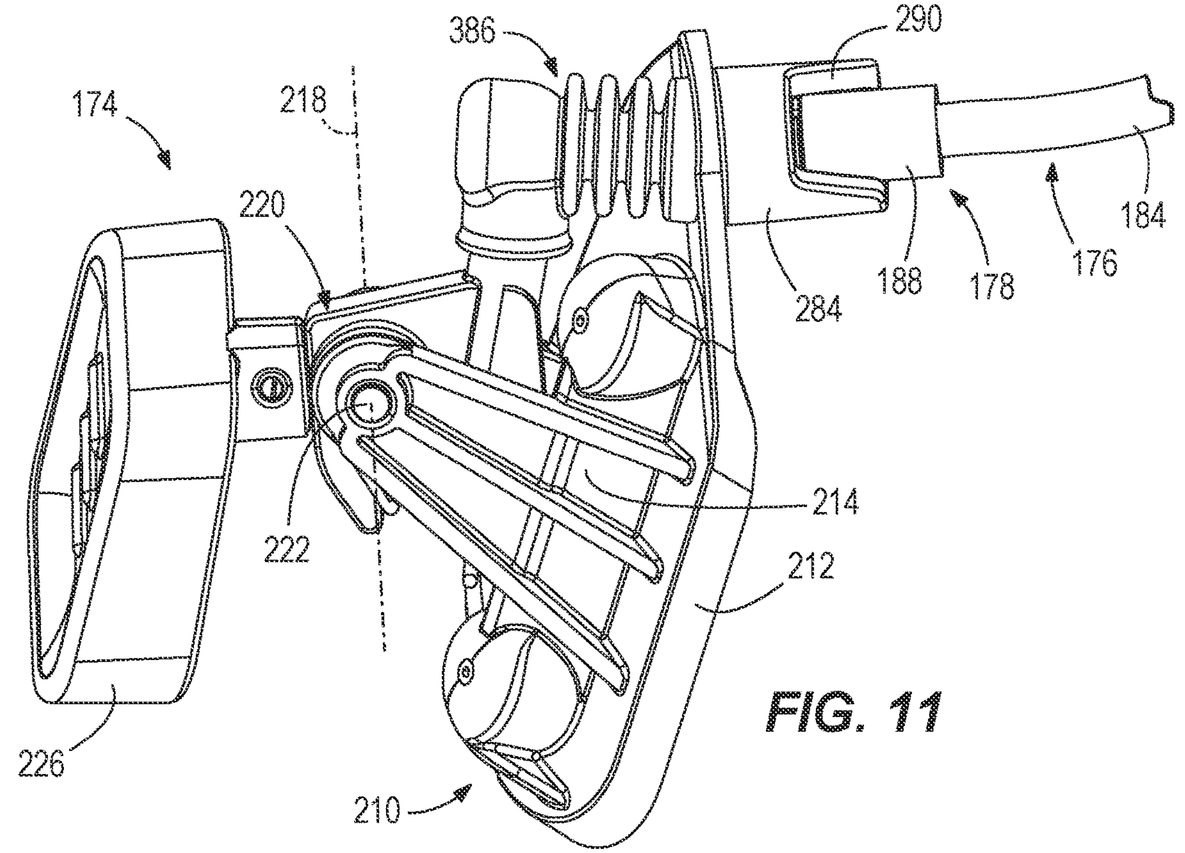
FIG. 11 is a detailed perspective view of the actuator assembly of FIG. 6 in an unpressed position.
Figure 12:
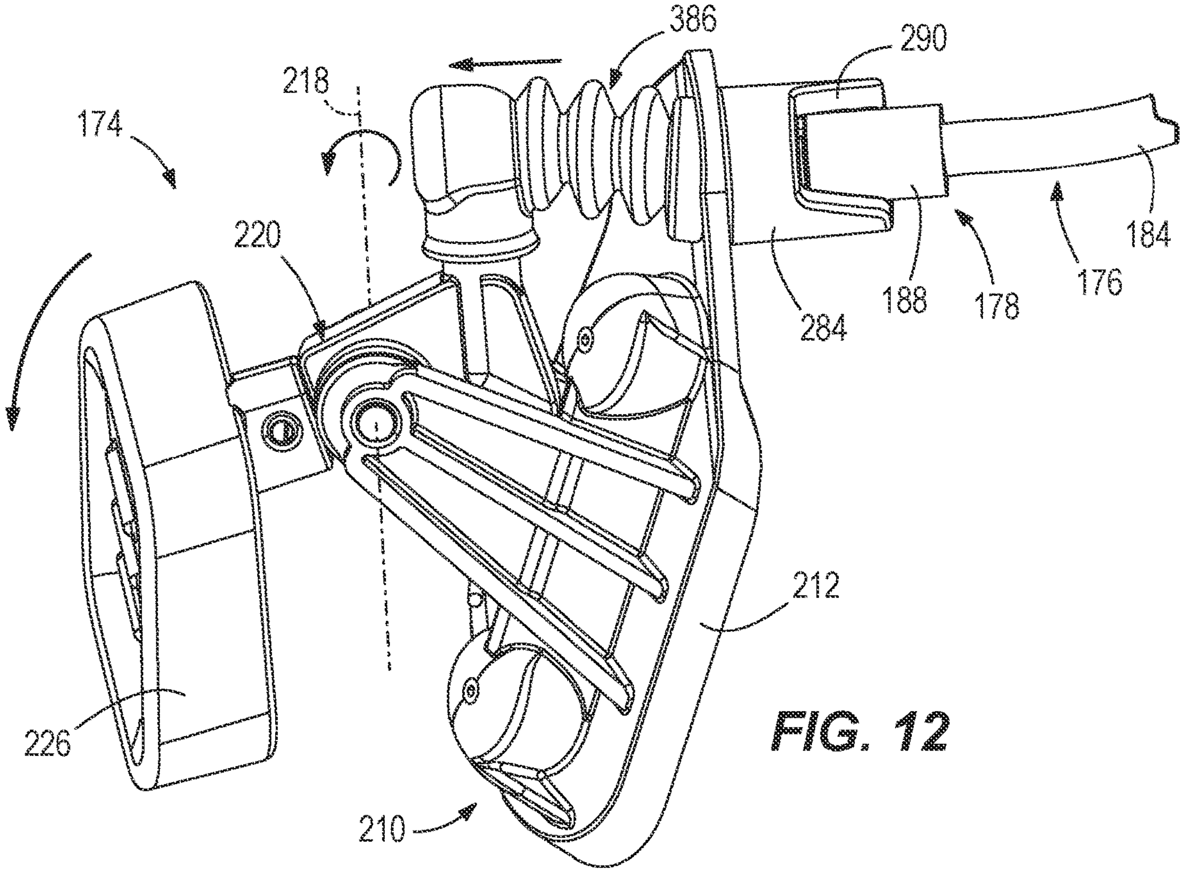
FIG. 12 is a detailed perspective view of the actuator assembly of FIG. 11 in a pressed position.

Referring to FIGS. 7-9, 11, and 12 the actuator assembly 174 includes a button 220, for example a rocker button 220, that is movable into and between an unpressed position (FIG. 11) and a pressed position (FIG. 12), thereby moving the actuator assembly 174 into and between the unpressed position and the pressed position. In the illustrated embodiment, movement of the actuator assembly 174 into the pressed position causes the actuator assembly 174 to actuate the lock assembly 172 to move into the unlocked position. The actuator assembly 174 includes an actuator bracket 210 with a body 212 and a pair of spaced apart arms 214 projecting outward from the body 212. Opposing through-bores 216 are formed in each of the arms 214. A rocker button 220 is rotatably supported on the actuator bracket 210 between the arms 214 by a fastener or pin 222, which extends through an opening 224 in the rocker button 220 and is received in the through-bores 216 in the arms 214. The rocker button 220 is configured to rotate about an axis 218 defined by the pin 222 (FIG. 11).

Figure 7:
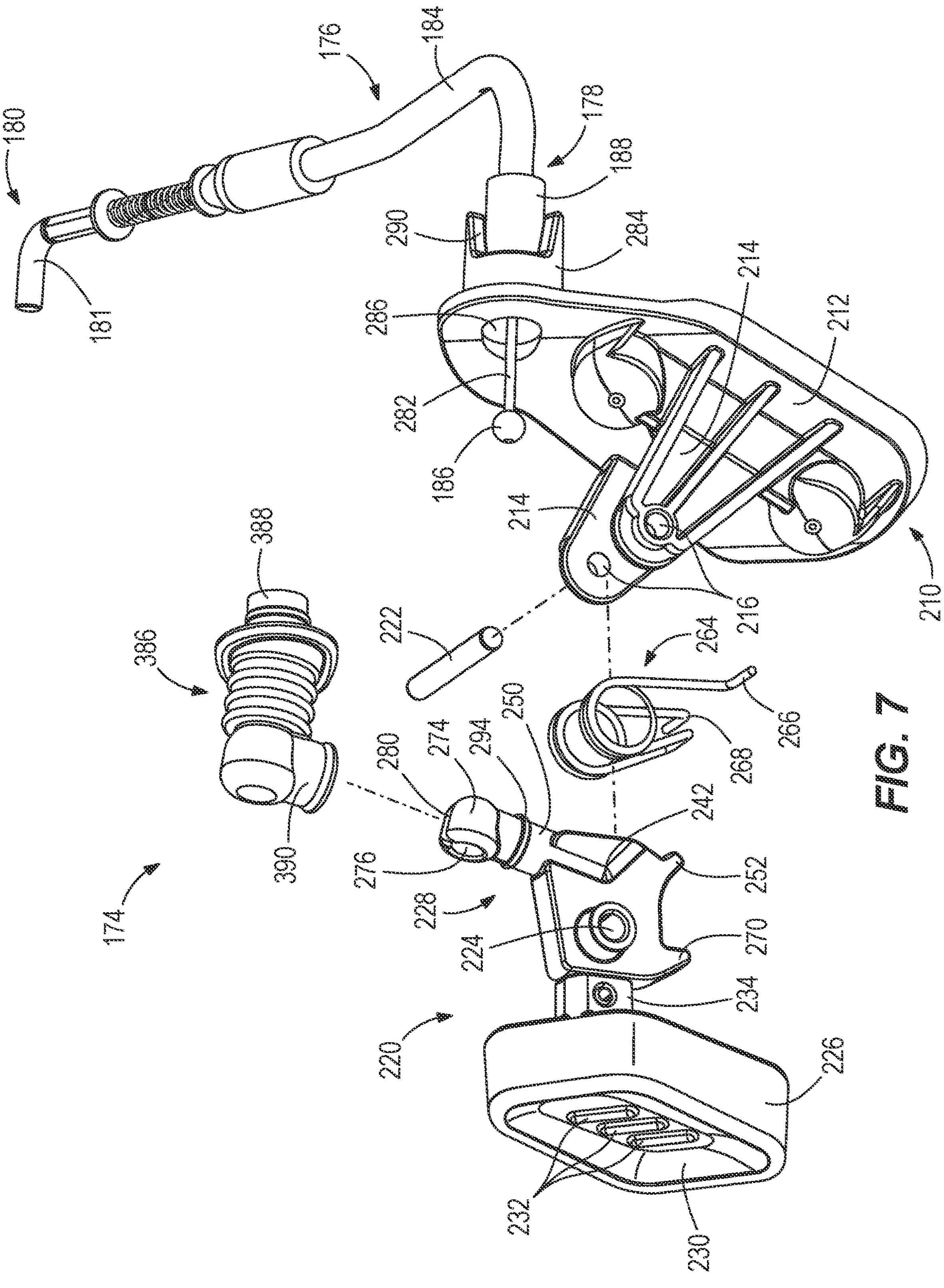
FIG. 7 is an exploded perspective view of the actuator assembly of FIG. 6.
Figure 8:
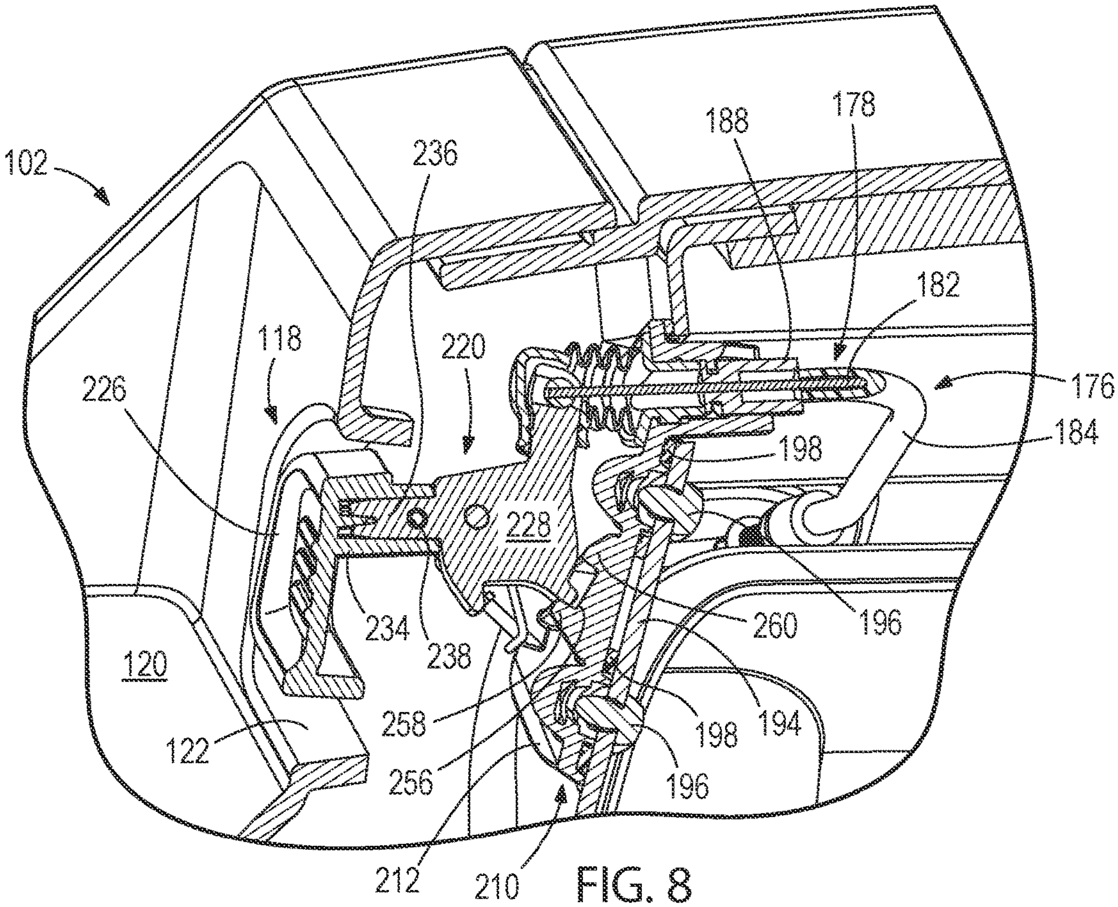
FIG. 8 is a view of section 8-8, taken in FIG. 2.

Referring to FIG. 7, the illustrated rocker button 220 includes a button 226 coupled to a rocker arm 228 pivotably mounted on the pin 222. The body of the button 226 includes a recess 230 formed in an outward-facing surface and at least one friction grip 232 positioned in the recess 230. As best illustrated in FIG. 8, a neck 234 extends from an inward-facing side of the button 226 and is configured to receive a stem 236 extending from the rocker arm 228. A pin 238 couples the neck 234 to the stem 236, thereby retaining the stem 236 in the neck 234. Some embodiments may be configured with a unitary rocker button formed as a single part, and/or a rocker button formed with at least one additional part. The rocker arm 228 includes a body 242 through which the mounting opening 224 is formed.

Referring to FIGS. 7 and 8, the stem 236 extends outward from a first side of the body 242, and a connecting member 250 extends outward and upwardly from an opposing second side of the body 242. The connecting member 250 has a receiver 274 with a generally hemispherical recessed surface 276 formed around a central opening 278 (FIG. 9) through the receiver 274 and an entry slot 280 formed in a top end of the connecting member 250. A stop member 252 extends from a bottom side of the rocker arm body 242 and is received in a slot 256 formed in the body 212 of the actuator bracket 210 between the two arms 214. As the rocker button 220 pivots between the pressed position and the unpressed position, the stop member 252 abuts a first stop surface 258 or a second stop surface 260 of the slot 256 when the rocker button 220 is the unpressed or pressed position, respectively. This may be useful, for example, to prevent over-rotation of the rocker arm 228. The actuator assembly 174 includes a return spring 264 configured to bias the rocker button 220 into the unpressed position. The illustrated spring 264, for example, is configured as a double coil torsion spring 264 that straddles the rocker arm 228 and includes a first end 266 which abuts the actuator bracket 210 and a second end 268 that abuts a projection 270 extending from the bottom side of the rocker arm 228. Some embodiments, however, may include a differently configured return spring.

Figure 10:
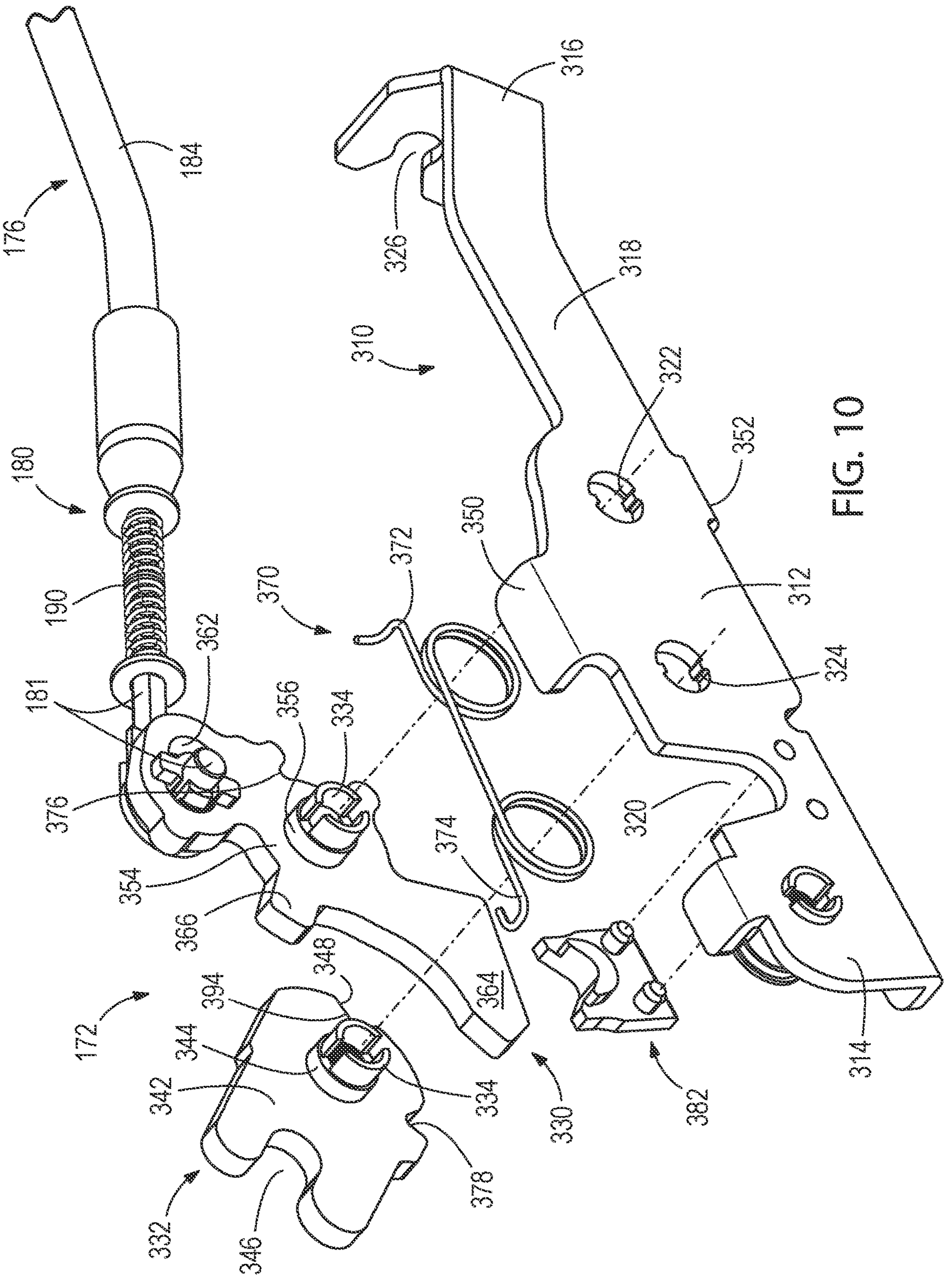
FIG. 10 is an exploded perspective view of the lock assembly of FIG. 6.
Figure 13:
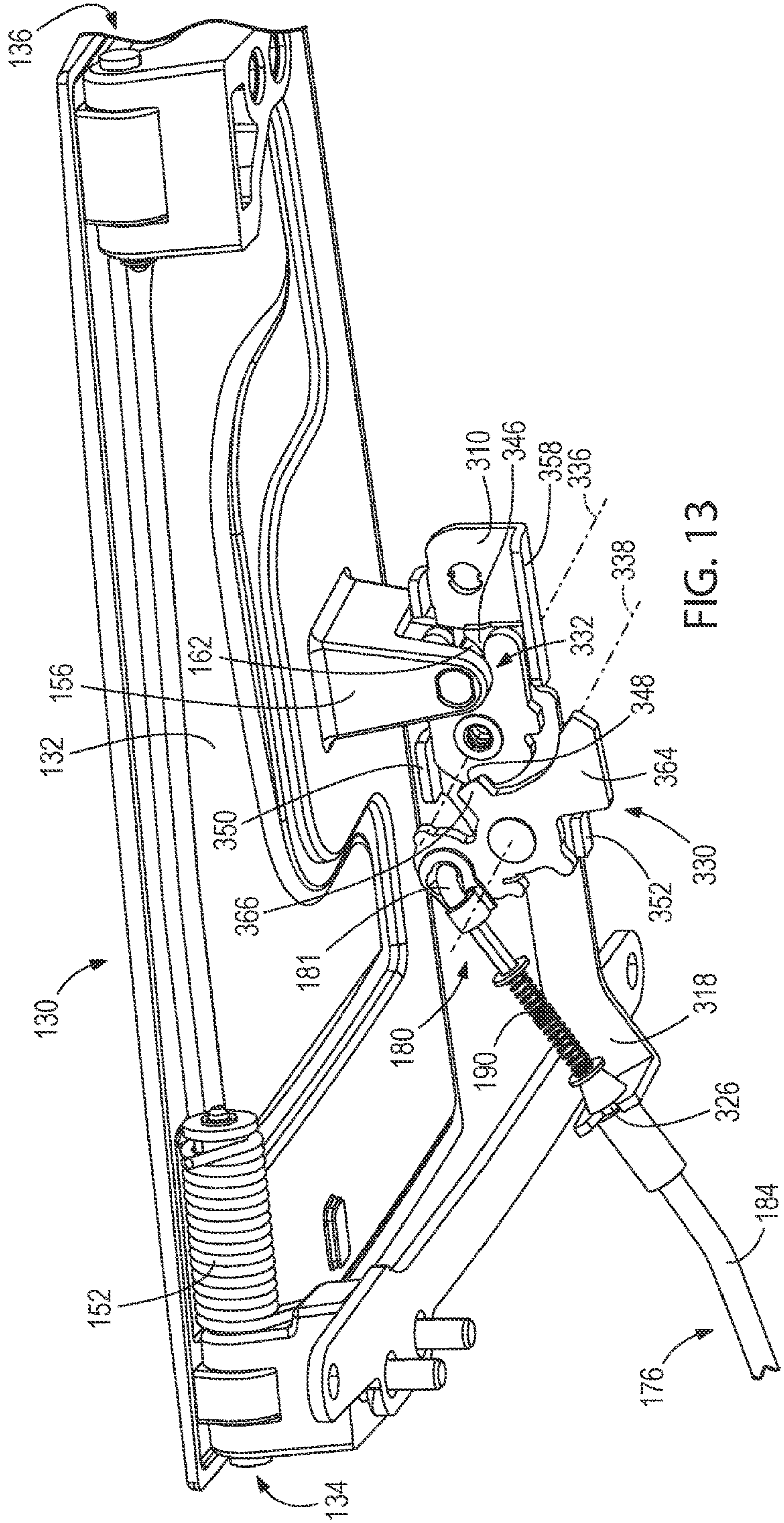
FIG. 13 is a detailed perspective view of the lock assembly and the service door of FIG. 6 with the lock assembly in the locked position.
Figure 14:
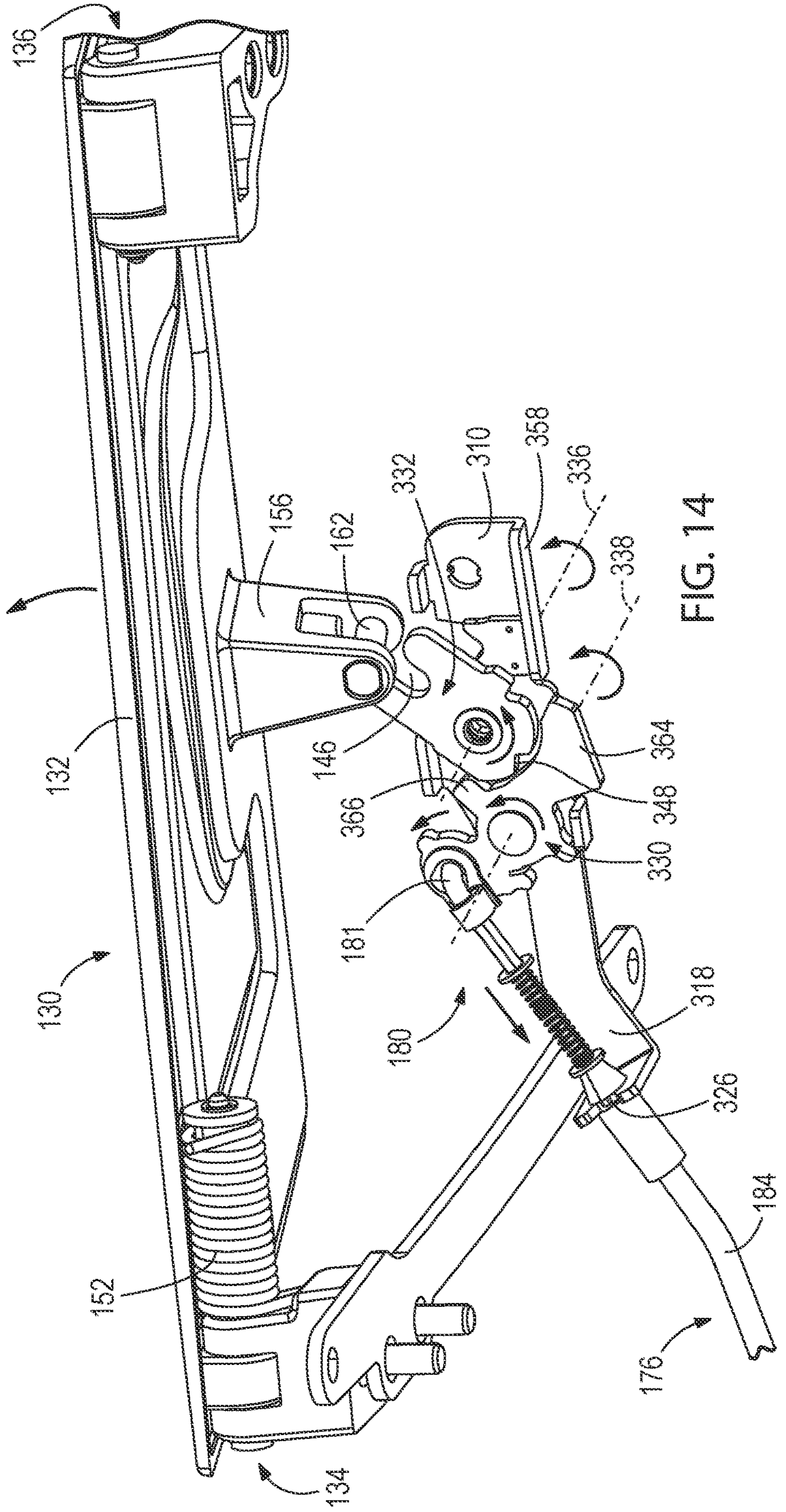
FIG. 14 is a detailed perspective view of the lock assembly and service door of FIG. 13 with lock assembly in the unlocked position.

Referring to FIGS. 10, 13 and 14, the lock assembly 172 includes a latching bracket 310 with generally planar body 312 extending from a first end 314 to an arm 318 at a second end 316. A cutout 320 is formed into an upper edge of the body 312 and is configured to receive the roller pin 162 on the service door 130. Two through-bores 322, 324 are formed in the body 312 between the cutout 320 and the arm 318 and are configured for rotatably supporting a lock member 330 and a latch member 332 on the latching bracket 310. A first through-bore 322 is positioned proximate the arm 318 and is configured to receive an axle connector 334 to rotatably couple the lock member 330 to the latching bracket 310 such that the lock member 330 may rotate about a corresponding axis 338 (see FIG. 13) defined by the corresponding axle connector 334. A second through bore 324 is positioned proximate the cutout 320 and is configured to receive an axle connector 334 to rotatably couple the latch member 332 to the latching bracket 310 such that the latch member 332 may rotate about a corresponding axis 336 (see FIG. 13) defined by the corresponding axle connector 334.

The latch member 332 is movable into and between a latched position (FIG. 13) in which the latch member 332 retains the service door 130 in the closed position and an unlatched position (FIG. 14) in which the service door 130 is movable between the closed and open positions. The latch member 332 has a generally planar body 342 with a through-bore 344 configured to rotatably receive an axle connector 334. A latch slot 346 is formed into a first end of the latch member 332 and a stop surface 348 is located on a second end of the latch member 332 opposite the first end. Rotation of the latch member 332 about the axis 336 is bound by two stop members 350, 358 (FIG. 13) on the latching bracket 310. A first stop 350 is formed proximate the top edge of the latching bracket 310 and is configured to over-rotation of the latch member 332 past a desired unlatched position. A second stop 358 is formed proximate the lower edge of the latching bracket 310 and is configured to over-rotation of the latch member 332 past a desired latched position.

The lock member 330 is movable into and between an unactuated position (FIG. 13) in which the latch member 332 is retained in the latched position and an actuated position (FIG. 14) in which the latching member 332 may rotate from the latched position to the unlatched position. The lock member 330 has a generally planar body 354 (see FIG. 10) with a through-bore 356 configured to rotatably receive an axle connector 334. A first end of the lock member 330 includes an attachment slot 362 configured to receive the second end 180 of the flexible connector 176. An opposite second end of the lock member 330 includes a counterweight 364. A locking protrusion 366 extend outward from the lock member 330 between the attachment slot 362 and the counterweight 364. When the lock member 330 is in the unactuated position (e.g., prior to actuation of the lock member 330 by the actuator assembly 174), the locking protrusion 366 is configured to abut the stop surface 348 on the latch member 332 to retain the latch member 332 in the latched position. Rotation of the lock member 330 about the axis 338 is bound by a third stop member 352 formed proximate a lower edge of the latching bracket 310, which is configured to abut lock member 330 to prevent over-rotation past the desired actuated position and the desired unactuated position.

With continued reference to FIGS. 10, 13 and 14, the lock assembly 172 includes a biasing device 370 configured to bias the lock member 330 into the unactuated position and the latch member 332 into the unlatched position. The illustrated biasing device 370 is configured as a double coil torsion spring 370 with a first coil configured to bias the lock member 330 and a second coil configured to bias the latch member 332. Other embodiments, however, may include separate biasing devices and/or a different biasing device, such as another type of spring, a resiliently deformable material, or another component that provides a biasing force. A first end 372 of the spring 370 is configured to engage and apply a biasing force to a corresponding groove 376 formed in the lock member 330. A second end 374 is configured to engage and apply a biasing force to a corresponding groove 378 formed in the latch member 332. A receiver plate 382 is coupled to the body 312 of the latching bracket 310 and includes a stop portion that extends into the cutout 320 and provide a lower surface for the roller pin 162 to abut.

Figure 9:
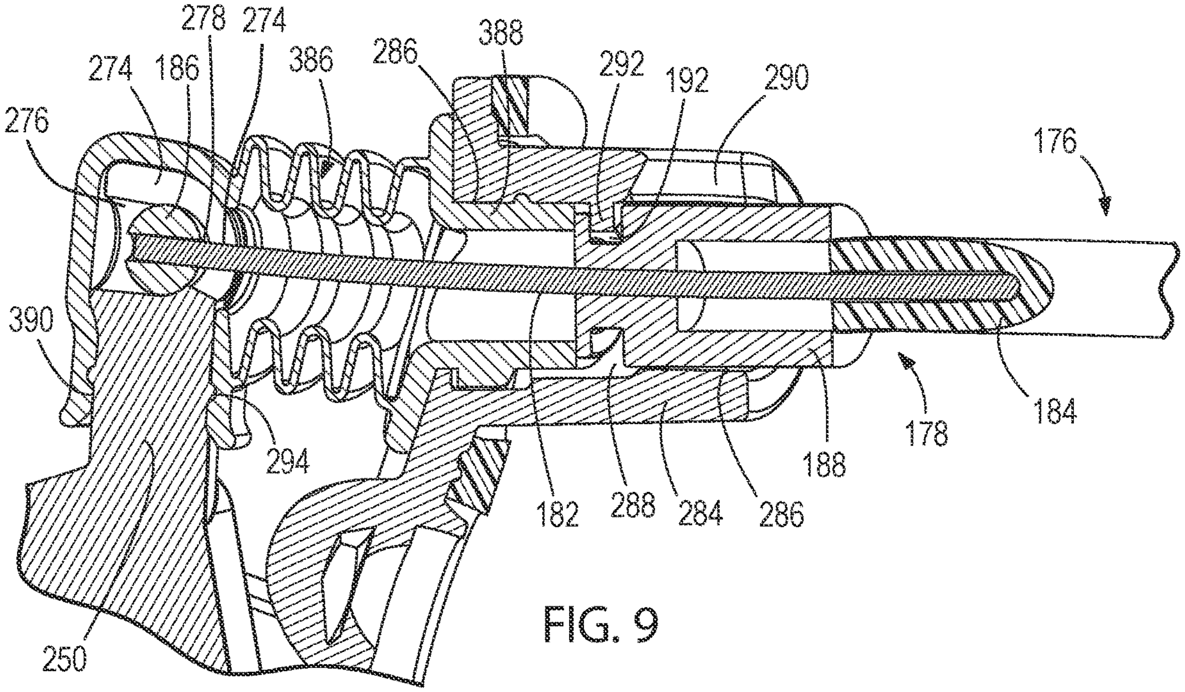
FIG. 9 is a detailed view of section 8-8, taken in FIG. 2.

As previously mentioned, the actuator assembly 174 and the lock assembly 172 are operatively linked by a flexible connector 176 extending therebetween. Referring to FIGS. 7, 9 and 10, the flexible connector 176 includes a cable 182 (see FIG. 9) which extends through a sleeve 184. A cylindrical bearing 186 is coupled to a first end of the cable 182, which extends out from a connector 188 at the first end of the sleeve 184. The second end of the cable 182 extends out the opposite second end of the sleeve 184 and through the center of a biasing device configured as a compression spring 190 (see FIG. 10). Other embodiments, however, may include a different biasing device, such as another type of spring, a resiliently deformable material, or another component that provides a biasing force. The second end of the sleeve 184 is received in a slot 326 positioned at a distal end of the arm 318 of the latching bracket 310, thereby indexing the sleeve 184 relative to the latching bracket 310. A rigid connecting member 181 is connected to the second end of the cable 182 and is configured to engage the attachment slot 362 in the lock member 330 to connect the cable 182 to the lock assembly 172. The compression spring 190 may be configured to tension the cable 182. Additionally or alternatively, the compression spring 190 (or other biasing device) may be configured to apply a return force to bias the lock member 330 back towards the unactuated position and/or to bias the latch member 332 into the latched position.

Referring to FIGS. 7-9, a cylindrical hub 284 extends from a rear side of the actuator bracket 210. A though-bore 286 is formed through the center of the cylindrical hub 284 and the body 212 of the actuator bracket 210 to provide a passage 288 through the cylindrical hub 284 and the body 212. As best illustrated in FIG. 7, the cylindrical hub 284 includes a cutout 290 formed into a portion of perimeter sidewall of the cylindrical hub 284. As best illustrated in FIG. 9, a rib 292 is formed around a portion of an inner surface of the passage 288 and extends radially inward therefrom. The cutout 290 and the rib 292 are positioned relative to each other so that the connector 188 at the first end of the sleeve 184 can be inserted into and coupled to the cylindrical hub 284. For example, the connector 188 can be inserted at into the cylindrical hub 284 via the cutout 290 at an angle relative to the axial length of the hub 284 and passage 288. A groove 192 is formed around the circumference of the connector 188. Once the groove 192 is aligned with the rib 292 on the cylindrical hub 284, the connector can be pivoted into alignment with the passage 288 to engage the rib 292 in the groove 192, thereby coupling the connector 188 to the actuator bracket 210.

The first end of the cable 182 extends out of the through-bore 286 to the connector member 250 on the rocker arm 228 and through the central opening 278 (FIG. 9). The cylindrical bearing 186 is seated in the receiver 274, thereby coupling the first end 178 of the flexible connector 176 to the rocker button 220. Between the actuator bracket 210 and the connector member 250 of the rocker arm 228, the cable 182 extends through a sealing boot 386. The sealing boot 386 is formed from a resiliently deformable material (e.g., rubber) and seals the opening of the through-bore 286. A first end 388 of the sealing boot 386 extends into the through-bore 286 and is retained therein by protrusions formed around the first end 388. The second end 390 of the sealing boot 386 extends over the receiver 274 and mates with a lip 294 formed around the connector member 250, thereby sealing the second end 390. This may be useful, for example, to prevent the ingress of liquid into the interior 106 of the cowling 100.

In the illustrated embodiments, the receiver 274 has a generally hemispherical recessed surface 276 configured to receive the bearing 186, and the curvature of the hemispherical recessed surface 276 generally matches curvature of the bearing 186. Some embodiments, however, may be differently configured. For example, at least one of the recessed surface 276 and the bearing 186 may be differently shaped or sized. A receiver 274 may be configured with a generally cylindrical recess configured to receive a bearing 186. Additionally or alternatively, the bearing may be configured as a cable stop with a different shape (e.g., a cylindrical cable stop) that is configured to be received in a recess formed in the receiver 274, which may have an outer surface that generally matches the shape of the cable stop, or that an outer surface that is different than the shape of the recess. Further still, some embodiments may be configured with a different arrangement for coupling the flexible cable 182 to the receiver. 274

As previously mentioned, the button 220 operable to unlock the latching mechanism 170 (FIGS. 5 and 6) may be at least partially concealed on the cowling 100. For example, referring to FIGS. 1, 2, and 8, the illustrated actuator assembly 174 is located on a lateral side 112 of the top cowl 102 within the opening 122 of the inlet 118. As best illustrated in FIG. 8, the actuator bracket 210 is secured to an interior wall 194 of the inlet 118 by at least one fastener 196. A sealing member 198 is sandwiched between the actuator bracket 210 and the surface of the interior wall 194, forming a seal therebetween. The actuator assembly 174 is positioned so that the button 226 is substantially flush with an exterior surface of the top cowl 102. Through research and experimentation, the present inventors have determined that this may be advantageous, for example, to provide a non-obtrusive actuator that does not interrupt the contours and aesthetic of the cowling 100. The location of the actuator assembly 174 may also be useful in preventing the service door 130 from opening as the result of an accidental press of the rocker button 220. Some embodiments, however, may include an actuator for unlocking the latching mechanism at another location on the cowling 100.

Referring to FIGS. 11-14, the service door may be opened by pressing the rocker button 220, thereby moving the rocker button 220 and the actuator assembly 174 into the pressed position. When the rocker button 220 is moved from the unpressed position (FIG. 11) into the pressed position (FIG. 12), the rocker button 220 rotates on the pin 222 about its axis of rotation 218. Rotation of the rocker arm 228 causes the receiver 274 of the connector member 250 to pull the cable 182 outward.

As the cable 182 is pulled by the rocker arm 228, the second end of the cable 182 pulls on the rigid connecting member 181 at the second end 180 of the flexible connector 176, thereby compressing the compression spring 190 and pulling on the attachment slot 362 of the lock member 330. As the rigid connecting member 181 pulls on the attachment slot 362, the lock member 330 rotates about its axis of rotation 338 from the unactuated position (FIG. 13) to the actuated position (FIG. 14). As the lock member 330 pivots into the actuated position, the locking protrusion 366 of the lock member 330 moves out of engagement with the stop surface 348 on the latch member 332. The torsion spring 370 (or other biasing device) then rotates the latch member 332 about its axis of rotation 336 from the latched position (FIG. 13) to the unlatched position (FIG. 14), thereby releasing the roller pin 162 from the latch slot 346. The torsion spring 152 on the hinge 134 of the service door 130 is then able to bias the service door 130 into the open position to provide access to the interior 106 of the cowling 100.

To close and re-latch the service door 130, the service door may be pushed from the open position to the closed position. As the service door 130 closes, the roller pin 162 engages the latch member 332, forcing it to rotate back into the latched position. Advantageously, the latch member 332 includes a cutout 394 positioned adjacent to the stop surface 348 which provides overstroke protection. That is, the cutout 394 prevents the latch member 332 from incidentally actuating the lock member 392 in the event that there is over-rotation as the latch member 332 returns to the resting latched position.

In some embodiments, at least one of the lock assembly 172 and the actuator assembly 174 may be balanced to prevent incidental actuation of the locking mechanism 170 (FIGS. 5 and 6). In the illustrated embodiments, for example, the rocker button 220 of the actuator assembly 174 and the lock member 330 of the lock assembly 172 are each balanced so that their center of gravity is located along (i.e., coincident with) their respective axis of rotation 218, 338. As such, forces resulting from bumps and/or impacts to the marine drive and/or cowling 100 do not cause the rocker button 220 or the lock member 330 to rotate or actuate the latching mechanism 170.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A cowling for a marine drive, the cowling comprising:

a top cowl defining a cowling interior and an air inlet configured to direct air into the cowling interior;

a service door that is movable into an open position providing access to the cowling interior and a closed position enclosing the cowling interior; and a latching mechanism comprising:

a lock assembly movable into a locked position in which the service door is retained in the closed position and an unlocked position in which the service door is movable between the closed position and the open position, and an actuator assembly configured to remotely actuate the lock assembly, wherein the actuator assembly is located in the air inlet and is accessible from outside the top cowl.

2. The cowling according to claim 1, wherein the actuator assembly comprises a button configured to actuate the lock assembly.

3. A cowling for a marine drive, the cowling comprising:

a top cowl defining a cowling interior;

a service door that is movable into an open position providing access to the cowling interior and a closed position enclosing the cowling interior; and a latching mechanism comprising:

a lock assembly movable into a locked position in which the service door is retained in the closed position and an unlocked position in which the service door is movable between the closed position and the open position, and an actuator assembly comprising a rocker button that is pivotable about a pivot axis to actuate the lock assembly, the actuator assembly being remote from the lock assembly and accessible from outside the top cowl, wherein the rocker button has a center of gravity located along the pivot axis.

4. The cowling according to claim 1, wherein the service door is on a top side of the top cowl and the actuator assembly is on a lateral side of the top cowl.

5. The cowling according to claim 1, wherein the lock assembly comprises a latch member and a lock member configured to retain the latch member in a latched position prior to actuation of the lock member by the actuator assembly.

6. The cowling according to claim 5, further comprising a biasing device configured to bias the latch member into an unlatched position.

7. The cowling according to claim 5, wherein the lock member is movable into an unactuated position in which the latch member is retained in the latched position and an actuated position in which the latching member is movable from the latched position to an unlatched position; and further comprising a biasing device configured to bias the lock member into the unactuated position.

8. The cowling according to claim 5, wherein the lock member is movable into an unactuated position in which the latch member is retained in the latched position and an actuated position in which the latching member is movable from the latched position to an unlatched position; and further comprising a biasing device configured to bias the lock member into the unactuated position and the latch member into the unlatched position.

9. The cowling according to claim 1, further comprising a flexible connector having a first end coupled to the actuator assembly and a second end coupled to the lock assembly.

10. A cowling for a marine drive the cowling comprising:

a top cowl defining a cowling interior;

a service door that is movable into an open position providing access to the cowling interior and a closed position enclosing the cowling interior; and a latching mechanism comprising:

a lock assembly movable into a locked position in which the service door is retained in the closed position and an unlocked position in which the service door is movable between the closed position and the open position, and;

an actuator assembly configured to actuate the lock assembly to move from the locked position to the unlocked position;

wherein the actuator assembly is remote from the lock assembly and accessible from outside the top cowl;

a flexible connector comprising a sleeve and a cable extending through the sleeve from a first cable end coupled to the actuator assembly to a second end coupled to the lock assembly, the cable being slidable in the sleeve, and wherein the actuation assembly is configured to pull the first cable end to actuate the lock assembly.

11. The cowling according to claim 10, wherein the cable extends through a biasing device at an end of the flexible connector, the biasing device being configured to tension the cable.

12. The cowling according to claim 9, wherein the actuator assembly comprises a button pivotably mounted on an actuator bracket, and wherein the flexible connector extends through a throughbore in the actuator bracket and is coupled to the button.

13. The cowling according to claim 1, further comprising a biasing device configured to bias the service door into the open position.

14. A latching mechanism for a service door on a cowling for a marine drive the service door movable into an open position and a closed position, the latching mechanism comprising:

a lock assembly movable into a locked position in which the service door is retained in the closed position and an unlocked position in which the service door is movable between the closed position and the open position;

an actuator assembly configured to actuate the lock assembly to move from the locked position to the unlocked position, wherein the actuator assembly is remote from the lock assembly and accessible from outside the cowling; and a flexible connector operatively connecting the actuator assembly to the lock assembly the flexible connector having a first end coupled to the actuator assembly and a second end coupled to the lock assembly, wherein the lock assembly is located proximate the service door on a top side of the cowling and wherein the actuator assembly is located in an air inlet on a lateral side of the cowling.

15. A latching mechanism for a service door on a cowling for a marine drive, the service door movable into an open position and a closed position, the latching mechanism comprising:

a lock assembly movable into a locked position in which the service door is retained in the closed position and an unlocked position in which the service door is movable between the closed position and the open position;

an actuator assembly configured to actuate the lock assembly to move from the locked position to the unlocked position, wherein the actuator assembly is remote from the lock assembly and accessible from outside the cowling; and a flexible connector operatively connecting the actuator assembly to the lock assembly the flexible connector having a first end coupled to the actuator assembly and a second end coupled to the lock assembly, wherein the actuator assembly comprises a rocker button that is pivotable about a pivot axis between an unpressed position and a pressed position; and wherein the rocker button is balanced so that a center of gravity of the rocker button is located along the pivot axis.

16. The latching mechanism according to claim 14, wherein the lock assembly comprises a latch member movable into a latched position in which the latch member retains the service door in the closed position and an unlatched position in which the service door is movable between the closed position and the open positions; and a lock member configured to retain the latch member in the latched position prior to actuation of the lock member by the actuator assembly.

17. The latching mechanism according to claim 16, wherein the lock member is movable, via the actuator assembly, into an unactuated position in which the latch member is retained in the latched position and an actuated position in which the latching member is movable from the latched position to the unlatched position.

18. A latching mechanism for a service door on a cowling for a marine drive, the service door movable into an open position and a closed position, the latching mechanism comprising:

a lock assembly movable into a locked position in which the service door is retained in the closed position and an unlocked position in which the service door is movable between the closed position and the open position;

an actuator assembly configured to actuate the lock assembly to move from the locked position to the unlocked position, wherein the actuator assembly is remote from the lock assembly and accessible from outside the cowling;

a flexible connector operatively connecting the actuator assembly to the lock assembly, the flexible connector having a first end coupled to the actuator assembly and a second end coupled to the lock assembly, wherein the lock assembly comprises a latch member movable into a latched position in which the latch member retains the service door in the closed position and an unlatched position in which the service door is movable between the closed position and the open position;

a lock member configured to retain the latch member in the latched position prior to actuation of the lock member by the actuator assembly, wherein the lock member is movable into an unactuated position in which the latch member is retained in the latched position and an actuated position in which the latching member is movable from the latched position to the unlatched position; and a first biasing device configured to bias the lock member into the unactuated position and a second biasing device configured to bias the latch member into the unlatched position.

19. The latching mechanism according to claim 18, wherein the first biasing device and the second biasing device are part of a unitary double coil torsion spring.

20. A latching mechanism for a service door on a cowling for a marine drive, the service door movable into an open position and a closed position, the latching mechanism comprising:

a lock assembly movable into a locked position in which the service door is retained in the closed position and an unlocked position in which the service door is movable between the closed position and the open position;

an actuator assembly configured to actuate the lock assembly to move from the locked position to the unlocked position, wherein the actuator assembly is remote from the lock assembly and accessible from outside the cowling; and a flexible connector operatively connecting the actuator assembly to the lock assembly the flexible connector having a first end coupled to the actuator assembly and a second end coupled to the lock assembly, wherein the flexible connector comprises a sleeve and a cable extending through the sleeve from a first cable end coupled to the actuator assembly and a second cable end coupled to the lock assembly, the cable being slidable within the sleeve, wherein the actuation assembly is configured to pull the first cable end of the cable to actuate the lock assembly to move from the locked position to the unlocked position.

21. The latching mechanism according to claim 20, wherein the flexible connector includes a biasing device at one of the first end of the flexible connector and the second end of the flexible connector, and wherein the biasing device is configured to tension the cable.

22. The latching mechanism according to claim 21, wherein the actuator assembly comprises a rocker button and the lock assembly comprises a lock member; and wherein the biasing device of the flexible connector is configured to bias the rocker button into an unpressed position and the lock member into an unactuated position.

* * * * *